United States Patent
Lewis et al.

(10) Patent No.: US 8,109,704 B2
(45) Date of Patent: Feb. 7, 2012

(54) NUT ASSEMBLY FOR DRAIN PAN

(75) Inventors: Jeffrey C. Lewis, Addison Township, MI (US); Srecko Zdravkovic, Sterling Heights, MI (US)

(73) Assignee: Whitesell International Corporation, Taylor, MI (US)

( * ) Notice: Subject to any disclaimer, the term of this patent is extended or adjusted under 35 U.S.C. 154(b) by 180 days.

(21) Appl. No.: 12/702,420

(22) Filed: Feb. 9, 2010

(65) Prior Publication Data

US 2011/0194913 A1 Aug. 11, 2011

(51) Int. Cl.
*F16B 39/284* (2006.01)
(52) U.S. Cl. .......................... 411/111; 411/171
(58) Field of Classification Search .......... 411/111–113, 411/119, 120, 123, 124, 131, 134
See application file for complete search history.

(56) References Cited

U.S. PATENT DOCUMENTS

| | | | |
|---|---|---|---|
| 2,655,932 A | 10/1953 | Lipman | |
| 2,682,906 A * | 7/1954 | Poupitch | 411/112 |
| 3,695,324 A | 10/1972 | Gulistan | |
| 3,785,421 A | 1/1974 | Launay | |
| 4,015,650 A | 4/1977 | Anderson | |
| 4,193,435 A | 3/1980 | Charles et al. | |
| 4,263,831 A | 4/1981 | Smith | |
| 5,096,350 A | 3/1992 | Peterson | |
| 5,547,042 A | 8/1996 | Platt | |
| 7,134,821 B2 | 11/2006 | Clinch et al. | |
| 7,156,599 B2 * | 1/2007 | Clinch et al. | 411/111 |
| 7,357,225 B2 | 4/2008 | Dorian | |
| 2003/0129041 A1 | 7/2003 | Mitts et al. | |
| 2004/0047705 A1 * | 3/2004 | Cutshall | 411/111 |
| 2009/0218168 A1 | 9/2009 | Diehl et al. | |

FOREIGN PATENT DOCUMENTS

| | | |
|---|---|---|
| DE | 19718042 | 11/1998 |
| GB | 667482 | 3/1952 |
| WO | WO 2008/058815 | 5/2008 |

OTHER PUBLICATIONS

International Search Report and Written Opinon for Application No. PCT/US2011/024020 dated Apr. 27, 2011 (8 pages).

* cited by examiner

*Primary Examiner* — Gary Estremsky
(74) *Attorney, Agent, or Firm* — Dierker & Associates, P.C.

(57) ABSTRACT

A cage nut assembly for a drain pan includes a nut having a barrel with a barrel end and a distal end opposed thereto. A flange at the distal end has a flange face abutting the drain pan inner surface. A threaded bore is defined along a central axis through the barrel and flange. At least one channel is defined in the flange face and allows substantially complete drainage of a fluid from a sump through a single drain aperture. A cage having a plate with a central aperture receives the barrel with substantial clearance to an edge of the central aperture. Leg(s) extend substantially orthogonally from the plate. An attachment projection on the leg(s) attaches the assembly to the drain pan. The assembly accepts a flange bolt removably installed through the single drain aperture. The flange bolt removably compresses a seal around a periphery of the single drain aperture.

20 Claims, 4 Drawing Sheets

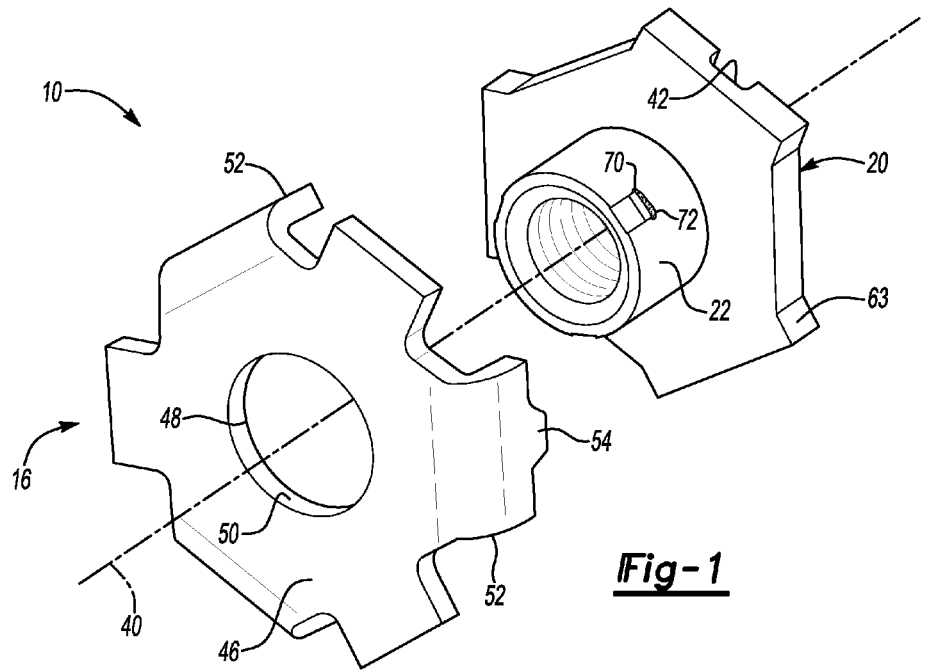
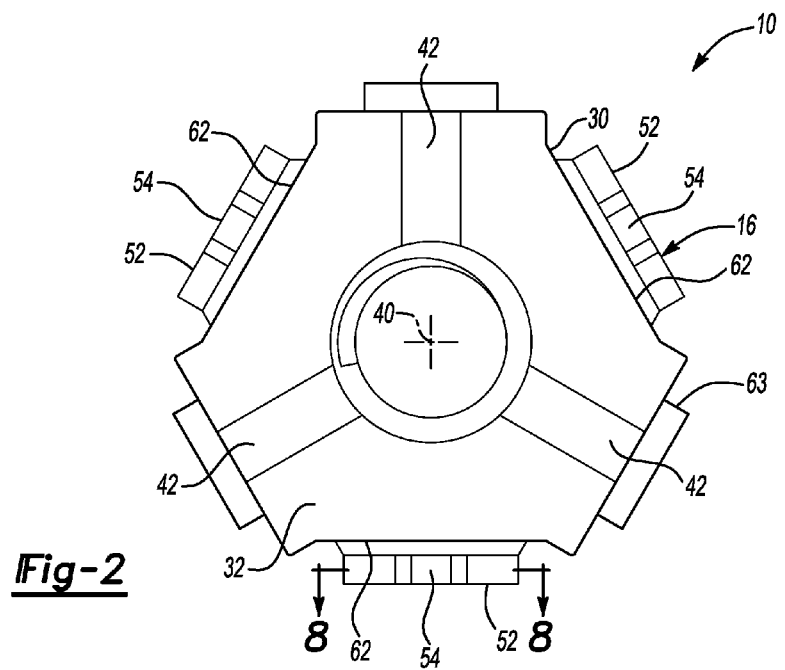

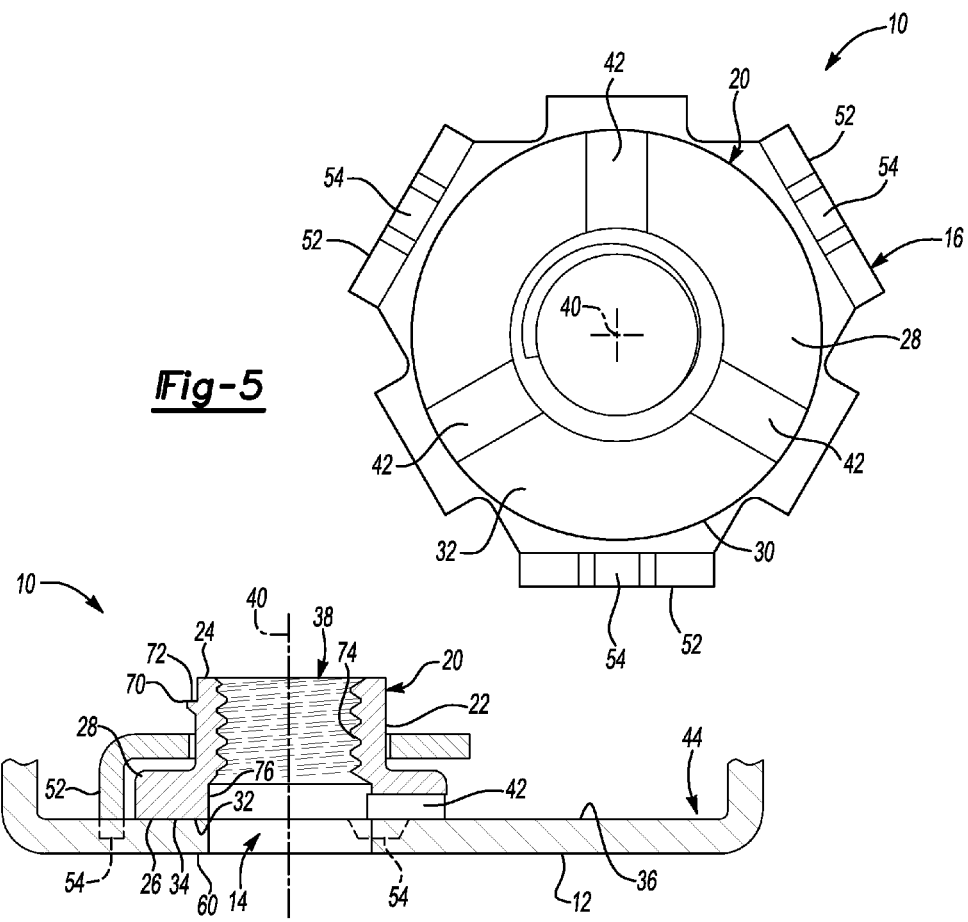

NUT ASSEMBLY FOR DRAIN PAN

BACKGROUND

Cage nut assemblies are used to hold a threaded nut in a location that may be difficult or impossible to reach. Cage nut assemblies may be used to simplify final assembly operations in various manufacturing situations.

SUMMARY

A cage nut assembly for a drain pan is disclosed herein. The cage nut assembly includes a nut having a barrel with a barrel end and a distal end opposed to the barrel end. A flange having an outer edge is disposed at the distal end of the nut. A flange face is defined on an end of the flange, and the flange face is configured to abut an inner surface of the drain pan. A threaded bore is defined along a central axis through the barrel and the flange. At least one channel is defined in the flange face. The at least one channel is configured to allow substantially complete drainage of a fluid from a sump through a single drain aperture. The cage nut assembly further includes a cage having a plate with a central aperture defined therein configured to receive the barrel with substantial clearance to an edge of the central aperture. At least one leg extends substantially orthogonally from the plate. An attachment projection is defined on the leg(s). The attachment projection is configured for attachment of the cage nut assembly to the drain pan. The cage nut assembly is configured to accept a flange bolt removably installed through the single drain aperture. The flange bolt is configured to removably compress a seal around a periphery of the single drain aperture.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1 is an exploded perspective view showing a cage and nut of an embodiment of the present disclosure;

FIG. 2 is a bottom view of the embodiment depicted in FIG. 1;

FIG. 5 is a bottom view of the embodiment depicted in FIG. 4;

FIG. 6 is a cutaway, partially exploded cross-sectional view of the embodiment depicted in FIGS. 4 and 5, additionally showing an embodiment of a drain pan, flange bolt and seal;

FIG. 7 is a cross-sectional view taken along line 7-7 of FIG. 4;

DETAILED DESCRIPTION

The present disclosure relates generally to a cage nut assembly, and more particularly to a cage nut assembly for a drain pan.

A drain pan is used to hold a fluid and allow the fluid to be selectively drained from the drain pan though a drain port established in the drain pain. Examples of a drain pan are an oil drain pan for crankcase oil in an internal combustion engine, and a transmission fluid drain pan for a hydraulic automatic transmission of an automobile. A drain plug may be a flange bolt threaded into the drain port, thereby providing a means for selectively draining and sealing the drain port. The drain pan may be formed from sheet metal that is too thin to provide threads in sufficient number and with sufficient durability for engaging the drain plug. A nut on the inside of the drain pan may provide sufficient threaded engagement to durably retain the drain plug. However, the inside of the drain pan may not be accessible for holding the nut during installation of the drain plug. In conventional drain pans, a nut secured to the drain pan (prior to installation of the drain pan) tends to prevent the complete drainage of the drain pan because the nut forms a dam around the drain port.

Some currently used methods for securing a nut to a drain pan are welding and brazing the nut to the drain pan. Welding and brazing nuts to a drain pan have been found to have drawbacks. For example, welding and brazing operations may not have sufficient locating accuracy to install the nut over the drain port without winking. It is to be understood that "winking" refers to the partial occlusion of a hole by a threaded fastener caused by misalignment between the threaded fastener and the hole. Welded and brazed nuts also may form a small dam around the drain port (as discussed above).

Clinch nuts are also currently used with drain pans. The clinch nuts have drawbacks in that they also form a small dam around the drain port. Further, providing a drain hole adjacent to the nut, with a large diameter seal circumscribing the drain hole, has been disclosed in the art.

The current disclosure includes a nut that provides threaded engagement of a drain plug, but substantially without drawbacks heretofore found in drain pan nut assemblies. Embodiments of the cage nut assembly of the present disclosure provide a nut that tolerates misalignment in the attachment operation, allows substantially complete drainage of the fluid from the drain pan, allows relatively close placement of the drain port to a side wall, and requires only a single drain aperture through the drain pan that can be sealed using a relatively small and conventional flange bolt with a seal.

Figure 3:
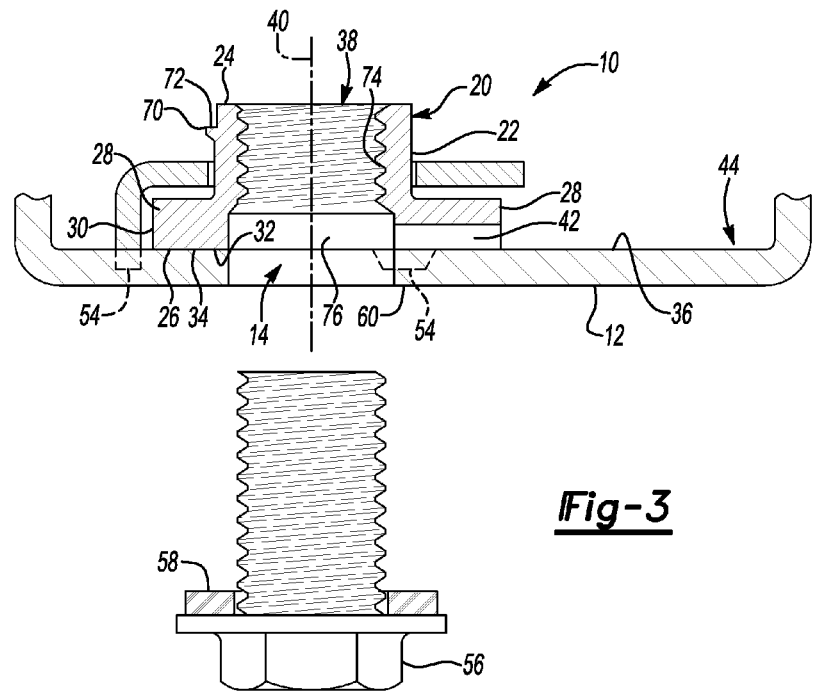
FIG. 3 is a cutaway, partially exploded cross-sectional view of the embodiment depicted in FIGS. 1 and 2, additionally showing an embodiment of a drain pan, flange bolt and seal.

Referring now to FIGS. 1-3, an embodiment of a cage nut assembly 10 for a drain pan 12 is shown. A single drain aperture 14 is defined in the drain pan 12. The cage nut assembly 10 includes a nut 20 having a barrel 22 with a barrel end 24. The nut 20 further includes a distal end 26 opposed to the barrel end 24.

A flange 28 is disposed at the distal end 26 of the barrel 22. The flange 28 has an outer edge 30. A flange face 32 is defined on an end 34 of the flange 28. The flange face 32 is configured to abut an inner surface 36 of the drain pan 12. A threaded bore 38 is defined along a central axis 40 through the barrel 22 and the flange 28. At least one channel 42 is defined in the flange face 32. The channel 42 is configured to allow substantially complete drainage of a fluid (not shown) from a sump 44 through the single drain aperture 14. In the embodiments depicted in FIGS. 1-6, three channels 42 are defined radially in the flange face 32. The three channels 42 lead from the outer edge 30 to the threaded bore 38. The cage nut assembly 10 further includes a cage 16 having a plate 46 with a central aperture 48 defined therein configured to receive the barrel 22 with substantial clearance to an edge 50 of the central aperture 48.

It is to be understood that the substantial clearance between the barrel 22 and the edge 50 may range from about 0.5 mm to about 2.0 mm per side. It is believed that the substantial clearance functions to allow the nut 20 to align with the single drain aperture 14, thereby tolerating misalignment of the cage nut assembly 10 in an operation attaching the cage nut assembly 10 to the drain pan 12. Further, it is to be understood that larger or smaller amounts of clearance may be advantageous for a particular use of the cage nut assembly 10.

In an embodiment, the central aperture 48 may have a diameter ranging from about 17 mm to about 20 mm, and the barrel 22 may have an outer diameter of about 16 mm.

Figure 4:
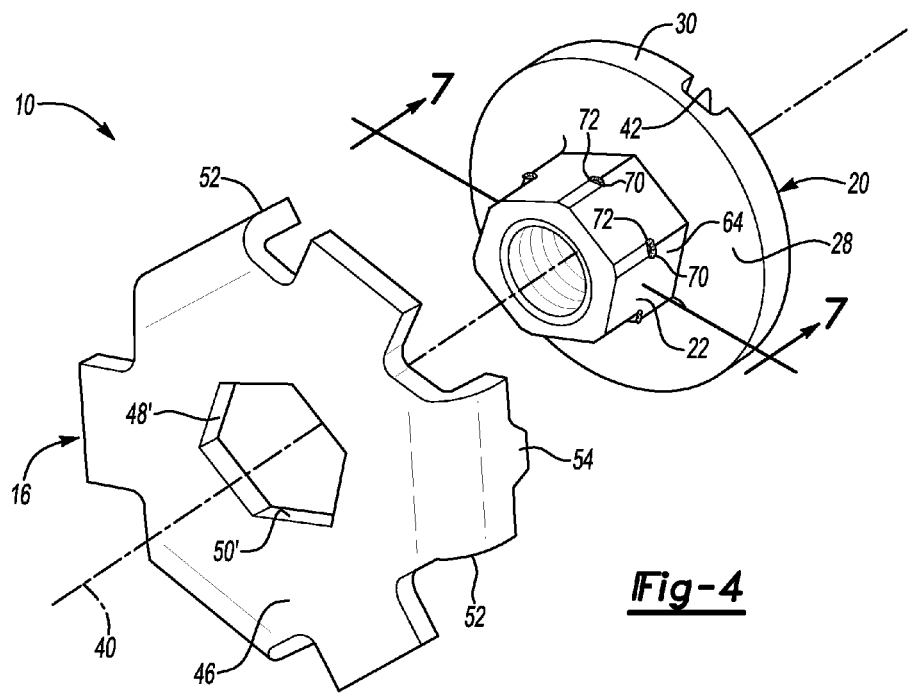
FIG. 4 is an exploded perspective view of another embodiment of a cage and nut.
Figure 8A:
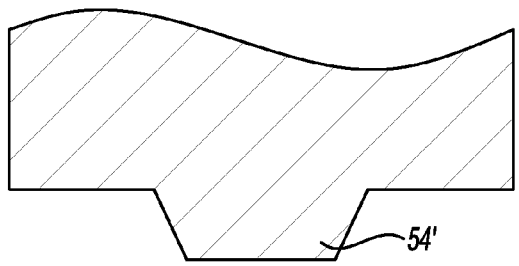
FIG. 8A is an enlarged, cutaway cross-sectional view taken along line 8-8 of FIG. 2, showing an embodiment of an attachment projection.
Figure 8B:
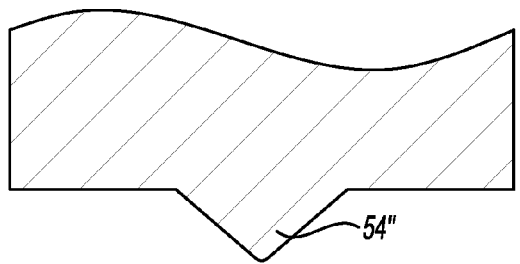
FIG. 8B is an enlarged, cutaway cross-sectional view taken along line 8-8 of FIG. 2, showing an alternate embodiment of an attachment projection.
Figure 8C:
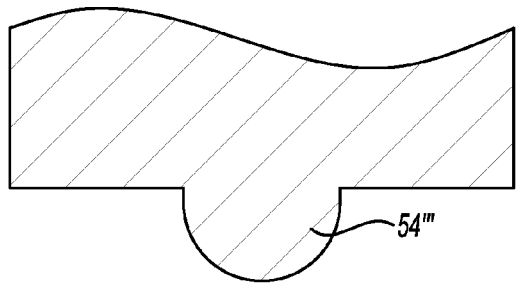
FIG. 8C is an enlarged, cutaway cross-sectional view taken along line 8-8 of FIG. 2, showing a further alternate embodiment of an attachment projection.
Figure 8D:
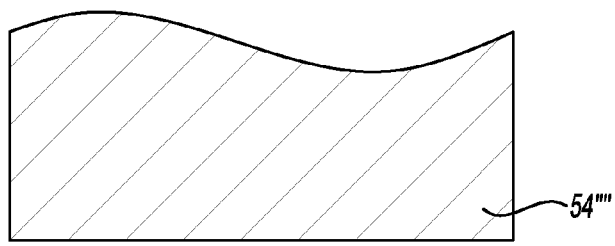
FIG. 8D is an enlarged, cutaway cross-sectional view taken along line 8-8 of FIG. 2, showing yet a further alternate embodiment of an attachment projection.

An attachment projection 54 may be defined on each leg 52. The attachment projection 54 is configured for attachment of the cage nut assembly 10 to the drain pan 12. It is to be understood that the attachment projection 54 may be any suitable projection, including but not limited to an attachment projection 54', 54'', 54''', 54'''' having a profile with the shape of a trapezoid, triangle, circular segment, or rectangle, as shown in FIGS. 8A-8D, respectively. In an embodiment, the attachment projection 54 is a weld projection used for projection welding the cage 16 to the drain pan 12. The size of the attachment projection 54 may depend on the attachment means and the desired strength of attachment. An example of an attachment projection 54 used in projection welding (as shown in FIGS. 1 and 4) may be about 2-6 mm long, about 1-2 mm deep and about 2-3 mm thick.

FIGS. 3 and 6 show the cage nut assembly 10 configured to accept a flange bolt 56 removably installed through the single drain aperture 14. The flange bolt 56 may be configured to removably compress a seal 58 around a periphery 60 of the single drain aperture 14.

As shown in the embodiment depicted in FIG. 1, the cage nut assembly 10 may further include at least one retainer 70 disposed on the barrel 22 for retention of the nut 20 in the cage 16. The retainer 70 may be a separate piece disposed on the barrel 22, or the retainer 70 may be formed from the barrel 22 by upsetting, swaging, knurling, or the like. It is to be understood that the retainer(s) 70 may be any suitable retention mechanism, including but not limited to push-on retainers, retaining rings, snap rings, PALNUT (stamped sheet metal check-nuts) type retainers, and/or the like, and/or combinations thereof. In an embodiment, the retainer 70 may be at least one retention stake 72. FIG. 1 depicts an embodiment wherein the retainers 70 are three swaged retention stakes 72. FIG. 4 depicts an embodiment having six retention stakes 72. It is to be understood that the substantial clearance between the barrel 22 and the edge 50 may be coordinated with the size and number of retainers 70 so as to substantially prevent undesired separation of the cage 16 from the nut 20 prior to installation of the cage nut assembly 10 onto the drain pan 12.

FIGS. 2 and 3 show the channel 42 leading from the outer edge 30 to the threaded bore 38. It is to be understood that threaded bore 38 may have a portion of the threaded bore 38 with screw threads 74 and another portion 76 of the bore 38 unthreaded, or partially threaded. In a non-limiting example, the threaded bore 38 may have M12 screw threads 74. Larger or smaller threaded bores may be suitable for drain pans. Although left handed or right handed threads are shown semi-schematically in FIGS. 1-6, it is to be understood that either left or right handed threads may be used.

The channel 42 may be sized suitably to allow drainage of the fluid from the drain pan 12. More viscous fluids may drain more rapidly if the channel 12 is larger than it would be for less viscous fluids. Fluids likely to have contamination (e.g., particulates and sludge) may require the channel 12 to be larger to prevent clogging. In an example, the channel 12 ranges from about 1-3 mm to about 3-6 mm wide and from about 2-4 mm deep.

In an embodiment, the cage nut assembly 10 may further include one or more substantially flat edge facets 62 defined on the outer edge 30. The facets 62 are each substantially parallel to the central axis 40. In the embodiment shown in FIGS. 1-3, three legs 52 are disposed substantially parallel to the substantially flat edge facets 62 on the outer edge 30, and the legs 52 are each configured to apply a reaction torque to the nut 20. The reaction torque may be communicated to the nut by engagement between the respective leg 52 and the outer edge 30.

Engagement may be with the one or more flat edge facets 62 or an other suitable structure defined or attached on the outer edge 30 that may engage the leg(s) 52. A non-limiting example of a suitable structure defined or attached on the outer edge 30 that may engage the leg(s) 52 is a prominence 63 that contacts leg(s) 52 upon suitable rotation of the nut 20. Other non-limiting examples of a suitable structure defined or attached on the outer edge 30 include hooks, pegs, roll-pins, dowels, set-screws, bumps, and/or the like, and/or combinations thereof. It is contemplated as being within the purview of the present disclosure to form the suitable structures (when included) from a single piece or multiple pieces.

It is to be understood that the cage 16 may be formed from any suitable material that is compatible with a desired attachment means and meets durability and strength requirements for a desired end use. For example, a plastic cage 16 may be used. In another embodiment, a metal cage 16 may be used. Examples of suitable metals include, but are not limited to aluminum, aluminum alloys, steel, zinc alloys, brass and cast iron. The cage 16 may be formed by any means suitable for the material of choice. For example, a plastic cage 16 may be molded, and a steel cage 16 may be formed by stamping and bending. In the embodiments depicted in FIGS. 1-6, the plate 46 of the cage 16 may be formed from material having a thickness ranging from about 1-3 mm.

FIGS. 1-3 depict an embodiment of a cage nut assembly 10 having three substantially flat edge facets 62 spaced at about 120 degree intervals around the central axis 40, and three legs 52 extending substantially orthogonally from the plate 46.

Referring now to FIGS. 4-7, it is to be understood that the barrel 22 may be substantially a right prism 64 having a polygon-shaped cross section 66 (as best seen in FIG. 7). As used herein, "substantially a right prism" means that vertices need not be sharp, and allowances for manufacturing variation and draft angles are within the meaning as disclosed herein. A non-limiting example of a polygon shaped cross section is substantially a hexagon-shaped cross section. By "substantially a hexagon-shaped cross section," a cross section having six sides is disclosed. However, it is to be understood that small variations are within the meaning as used herein. Non-limiting examples of small variations are, for example, rounded vertices of a hexagon. As shown in the embodiment depicted in FIGS. 4-6, the cage 16 may be configured to apply a reaction torque to the barrel 22 at the edge 50' of the central aperture 48' (as best seen in FIG. 4). In an embodiment having a hexagonal barrel 22, the central aperture 48' may be complementarily hexagonally shaped as shown in FIG. 4.

It is to be understood that any of the ranges provided herein include the stated range and any value or sub-range within the stated range. For example, a width range of about 1 mm to about 2 mm should be interpreted to include not only the recited width limits of about 1 mm to about 2 mm, but also to include individual widths, such as 1.2 mm, 1.3 mm, 1.4 mm, etc., and sub-ranges, such as 1.5 mm to 1.8 mm, 1.2 mm to 1.9 mm, etc.

While several embodiments have been described in detail, it will be apparent to those skilled in the art that the disclosed embodiments may be modified. Therefore, the foregoing description is to be considered exemplary rather than limiting.

What is claimed is:

1. A cage nut assembly for a drain pan having a single drain aperture defined therein, the cage nut assembly comprising:
    a nut having a barrel with a barrel end and a distal end opposed to the barrel end;
    a flange disposed at the distal end;
    a flange face defined on an end of the flange, the flange face configured to abut an inner surface of the drain pan;
    a threaded bore defined along a central axis through the barrel and the flange;
    at least one channel defined in the flange face, the at least one channel configured to allow substantially complete drainage of a fluid from a sump through the single drain aperture;
    a cage having a plate with a central aperture defined therein configured to receive the barrel with substantial clearance to an edge of the central aperture;
    at least one leg extending substantially orthogonally from the plate; and
    an attachment projection defined on the at least one leg, the attachment projection configured for attachment of the cage nut assembly to the drain pan;
    wherein the cage nut assembly is configured to accept a flange bolt removably installed through the single drain aperture, the flange bolt configured to removably compress a seal around a periphery of the single drain aperture.

2. The cage nut assembly as defined in claim 1 wherein the flange has an outer edge, and wherein the assembly further comprises:
    one or more substantially flat edge facets defined on the outer edge, the facets substantially parallel to the central axis;
    the at least one leg being disposed substantially parallel to the one or more substantially flat edge facets on the outer edge; and
    the at least one leg being configured to apply a reaction torque to the nut.

3. The cage nut assembly as defined in claim 1 wherein the barrel is substantially a right prism having a polygon-shaped cross section and wherein the cage is configured to apply a reaction torque to the barrel at the edge of the central aperture.

4. The cage nut assembly as defined in claim 3 wherein the polygon-shaped cross section is substantially a hexagon-shaped cross section.

5. The cage nut assembly as defined in claim 1, further comprising at least one retainer disposed on the barrel for retention of the nut in the cage.

6. The cage nut assembly as defined in claim 1 wherein the at least one channel leads from the outer edge to the threaded bore.

7. The cage nut assembly as defined in claim 2 wherein the one or more substantially flat edge facets is three substantially flat edge facets spaced at about 120 degree intervals around the central axis, and the at least one leg is three legs extending substantially orthogonally from the plate.

8. The cage nut assembly as defined in claim 7, further comprising at least one retention stake formed on the barrel for retention of the nut in the cage.

9. The cage nut assembly as defined in claim 7 wherein the substantial clearance ranges from about 0.5 mm to about 2.0 mm per side.

10. The cage nut assembly as defined in claim 7 wherein the at least one channel leads from the outer edge to the threaded bore.

11. The cage nut assembly as defined in claim 7 wherein the at least one channel is from about 2 mm to about 4 mm wide and from about 2 mm to about 4 mm deep.

12. The cage nut assembly as defined in claim 7 wherein the cage is formed from a material having a thickness ranging from about 1.5 mm to about 2.5 mm.

13. The cage nut assembly as defined in claim 7 wherein the attachment projection is about 4 mm long, about 1.5 mm deep and about 2.5 mm thick.

14. A cage nut assembly for a drain pan having a single drain aperture defined therein, the cage nut assembly comprising:
    a nut having a barrel with a barrel end and a distal end opposed to the barrel end;
    a flange disposed at the distal end, the flange having an outer edge with three substantially flat edge facets parallel to a central axis and spaced at about 120 degree intervals around the central axis;
    a flange face defined on an end of the flange, the flange face configured to abut an inner surface of the drain pan;
    a threaded bore defined along the central axis through the barrel and the flange;
    three channels defined radially in the flange face, the three channels configured to allow substantially complete drainage of fluid from a sump through the single drain aperture;
    a cage having a plate with a central aperture defined therein configured to receive the barrel with substantial radial clearance;
    three legs extending substantially orthogonally from the plate, the three legs disposed substantially parallel to the three flat edge facets of the outer edge, the three legs configured to apply a reaction torque to the nut; and
    an attachment projection defined on each leg, the attachment projection configured for attachment of the cage nut assembly to the drain pan;
    wherein the cage nut assembly is configured to accept a flange bolt removably installed through the single drain aperture, the flange bolt configured to removably compress a seal around a periphery of the single drain aperture.

15. The cage nut assembly as defined in claim 14, further comprising three retention stakes swaged on the barrel for retention of the nut in the cage.

16. The cage nut assembly as defined in claim 14 wherein the central aperture has a diameter ranging from about 17 mm to about 20 mm, the barrel has an outer diameter of about 16 mm, the bore is threaded with M12 thread, and the substantial radial clearance ranges from about 0.5 mm to about 2.0 mm per side.

17. The cage nut assembly as defined in claim 14 wherein the three channels lead from the outer edge to the threaded bore.

18. The cage nut assembly as defined in claim 14 wherein the three channels are each from about 2 mm to about 4 mm wide and from about 2 mm to about 4 mm deep.

19. The cage nut assembly as defined in claim 14 wherein the cage is formed from a material having a thickness ranging from about 1.5 mm to about 2.5 mm.

20. The cage nut assembly as defined in claim 14 wherein the attachment projection is about 4 mm long, about 1.5 mm deep and about 2.5 mm thick.

\* \* \* \* \*